United States Patent
Rodriguez

(10) Patent No.: US 11,041,541 B2
(45) Date of Patent: Jun. 22, 2021

(54) TORSIONAL VIBRATION ABSORBER WITH IMPROVED RETENTION FEATURE

(71) Applicant: GM GLOBAL TECHNOLOGY OPERATIONS LLC, Detroit, MI (US)

(72) Inventor: Rolando V. Rodriguez, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 16/569,825

(22) Filed: Sep. 13, 2019

(65) Prior Publication Data

US 2021/0079975 A1 Mar. 18, 2021

(51) Int. Cl.
*F16F 15/14* (2006.01)
*F16F 15/126* (2006.01)

(52) U.S. Cl.
CPC ........ *F16F 15/1442* (2013.01); *F16F 15/126* (2013.01); *F16F 2224/025* (2013.01); *F16F 2232/02* (2013.01); *F16F 2236/085* (2013.01)

(58) Field of Classification Search
CPC ....... F16F 15/12; F16F 15/126; F16F 15/1442
See application file for complete search history.

(56) References Cited

U.S. PATENT DOCUMENTS

| | | | | |
|---|---|---|---|---|
| 2,795,036 A | * | 6/1957 | Haushalter | F16F 15/1442 29/450 |
| 2,861,472 A | * | 11/1958 | Hansz | F16F 15/1442 74/574.4 |
| 3,078,737 A | * | 2/1963 | McGavern | F16F 15/1442 74/574.2 |
| 3,088,332 A | * | 5/1963 | Arnt, Jr. | F16F 15/126 74/574.4 |
| 4,083,265 A | * | 4/1978 | Bremer, Jr. | F16F 15/1435 74/574.2 |
| 5,231,893 A | * | 8/1993 | Sisco | F16F 15/126 74/574.4 |
| 5,988,015 A | * | 11/1999 | Riu | F16F 15/124 74/574.2 |
| 6,386,065 B1 | * | 5/2002 | Hodjat | F16F 15/126 474/94 |
| 9,909,642 B2 | * | 3/2018 | Duerre | F16F 15/136 |
| 2009/0145261 A1 | * | 6/2009 | Obeshaw | F16F 15/1442 74/574.4 |

FOREIGN PATENT DOCUMENTS

| | | | | |
|---|---|---|---|---|
| DE | 102004022050 A1 | * | 12/2005 | ............ F16F 15/126 |
| GB | 835314 A | * | 5/1960 | .......... F16F 15/1442 |
| GB | 933884 A | * | 8/1963 | ............ F16F 15/126 |

* cited by examiner

*Primary Examiner* — Melanie Torres Williams

(57) ABSTRACT

A torsional damper assembly includes a hub having an outer periphery, an annular elastomeric element disposed about the outer periphery, and an annular inertia ring disposed about the elastomeric element. The inertia ring has an inner periphery adjacent the elastomeric element. The outer periphery of the hub is provided with a first plurality of surface features and the inner periphery of the inertia ring is provided with a second plurality of surface features. The first plurality of surface features is complementary to and engaged with the second plurality of surface features.

4 Claims, 3 Drawing Sheets

TORSIONAL VIBRATION ABSORBER WITH IMPROVED RETENTION FEATURE

INTRODUCTION

The present disclosure relates to damping devices for a rotating shaft. More specifically, the disclosure relates to a torsional damping assembly for a drive shaft in a motor vehicle powertrain.

A drive shaft is a mechanical component used for transmitting rotation and torque from a powerplant to a receiver. Drive shafts are used to connect components of a drive train that cannot be connected directly because of a distance between or a relative movement between the powerplant and the receiver. In motor vehicles, drive shafts transmit torque from an engine to drive wheels. Engine output torque and vehicle inertia place loads on the drive shafts. The loads result in driveline torsional resonances that cause undesirable vehicle vibrations.

SUMMARY

A torsional damper assembly according to the present disclosure includes a hub having an outer periphery, an annular elastomeric element disposed about the outer periphery, and an annular inertia ring disposed about the elastomeric element. The inertia ring has an inner periphery adjacent the elastomeric element. The outer periphery of the hub is provided with a first plurality of surface features and the inner periphery of the inertia ring is provided with a second plurality of surface features. The first plurality of surface features is complementary to and engaged with the second plurality of surface features.

In an exemplary embodiment, the first plurality of surface features comprises a first set of circumferential ridges and circumferential grooves, and the second plurality of surface features comprises a second set of circumferential ridges and circumferential grooves. In such embodiments, at least one respective ridge of the first plurality of circumferential ridges and circumferential grooves may have an axially asymmetric profile.

In an exemplary embodiment, the assembly may also include a protective flange having an inboard portion coupled to the outer periphery of the hub and a radial extension portion extending outboard of the inboard portion. The radial extension portion is axially spaced from the inertia ring. In such embodiments, an outer diameter of the protective flange may be greater than an inner diameter of the inertia ring.

In an exemplary embodiment, the inertia ring has a first axial width at an inboard periphery and a second axial width at an outboard periphery, the first axial width being greater than the second axial width. In such embodiments, the inertia ring may have a profile comprising at least one arcuate section between the inboard periphery and the outboard periphery.

In an exemplary embodiment, the hub is disposed about a drive shaft of an automotive vehicle.

A torsional damper assembly according to an embodiment of the present disclosure includes a hub having an outer periphery, an annular elastomeric element disposed about the outer periphery; and an annular inertia ring disposed about the elastomeric element. The inertia ring has an inner periphery adjacent the elastomeric element. The assembly additionally includes a protective flange having an inboard portion coupled to the outer periphery of the hub and a radial extension portion extending outboard of the inboard portion. The radial extension portion is axially spaced from the inertia ring.

In an exemplary embodiment, an outer diameter of the protective flange is greater than an inner diameter of the inertia ring.

In an exemplary embodiment, the inertia ring has a first axial width at an inboard periphery and a second axial width at an outboard periphery. The first axial width is greater than the second axial width. In such embodiments, the inertia ring has a profile comprising at least one arcuate section between the inboard periphery and the outboard periphery.

In an exemplary embodiment, the hub is disposed about a drive shaft of an automotive vehicle.

Embodiments according to the present disclosure provide a number of advantages. For example, the present disclosure provides various features to increase retention of an inertia ring in a desired location of a vibration absorber assembly. These features may be implemented singly or in any suitable combination with one another to provide increased robustness without compromising performance of the vibration absorber.

The above advantage and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure generally add mechanical damping components to a rotating shaft in a drive system to reduce or minimize vibrations. In various embodiments, one or more torsional damper assemblies may be applied to one or more shafts between an engine and one or more drive wheels. The torsional damper assemblies are provided with one or more features which are configured to enhance retention of first and second components of the torsional damper assemblies to one another. Each shaft may be implemented as a drive shaft, an axle shaft, a propeller shaft, a Cardan shaft or other physically-long torque-transferring shaft.

Figure 1:
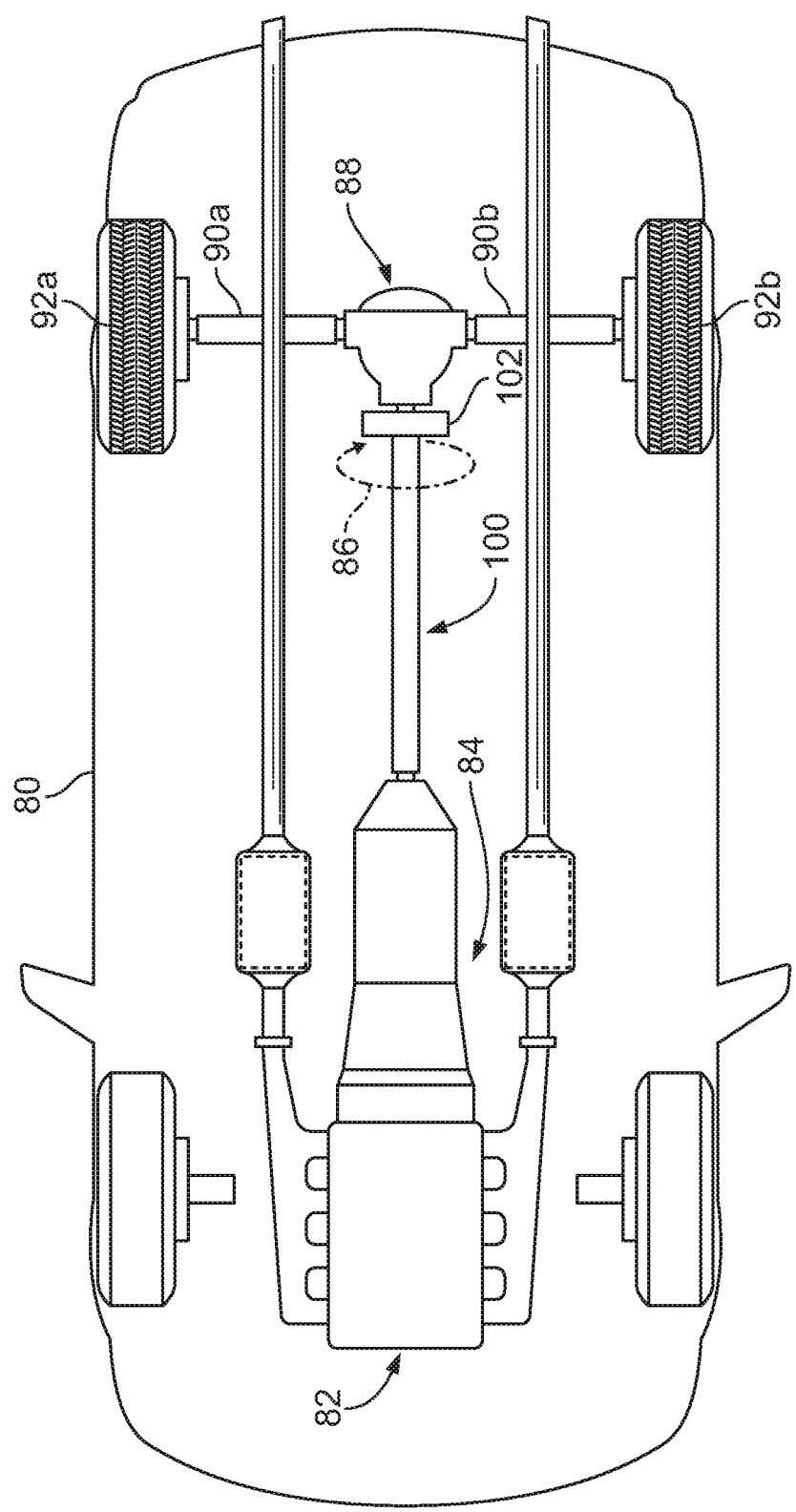
FIG. 1 is a schematic diagram illustrating a rotating shaft having a torsional damper assembly according to an embodiment of the present disclosure.

Referring to FIG. 1, a schematic diagram illustrating a rotating shaft 100 having a torsional damper assembly is shown. While FIG. 1 depicts the rotating shaft 100 in the context of a motor vehicle 80, embodiments contemplated within the scope of the invention include mobile vehicles such as automobiles, trucks, motorcycles, boats, trains and/or aircraft. In some embodiments, the platform may be a stationary object. The stationary objects may include, but are not limited to, powerplants, industrial machines and/or amusement rides. Other types of platforms may be implemented to meet the design criteria of a particular application.

The motor vehicle 80 generally includes a drive-train adapted for propelling the vehicle. The drive-train generally comprises a powerplant (e.g., an internal combustion engine) 82, a transmission 84, a differential 88, and one or more axle shafts (e.g., a first axle shaft 90a and a second axle shaft 90b) connected to one or more driven wheels (e.g., a first drive wheel 92a and a second drive wheel 92b). The drive shaft 100 is arranged to transmit engine torque 86 from the transmission 84 to the differential 88. Although the following disclosure primarily describes the drive shaft 100 as a shaft extending longitudinally between the transmission 84 and the differential 88, the drive shaft 100 may also be employed as the first axle shaft 90a and/or the second axle shaft 90b that extend between the differential 88 and the driven wheels 92a-92b.

A torsional damper assembly 102 is disposed about the drive shaft 100 and configured to reduce vibrations in the drive shaft 100. While illustrated proximate the differential 88, in orther embodiments the torsional damper assembly may be disposed at any suitable location relative to the drive shaft 100, e.g. at a midpoint between ends of the drive shaft 100.

As will be discussed in further detail below, the torsional damper assembly 102 includes an annular mass referred to as an inertia ring. In some prior art damper assemblies, the inertia ring could become dislodged from the torsional damper assembly, e.g. through contact with a rigid object below the vehicle. The torsional damper assembly 102 according to the present disclosure includes one or more features to increase retention of the inertia ring in the desired location. Various embodiments of the torsional damper assembly 102 will be discussed in further detail below. As will be appreciated by one of ordinary skill in the art, the respective retention features of the various embodiments may be implemented singly or in combination with one another.

Figure 2:
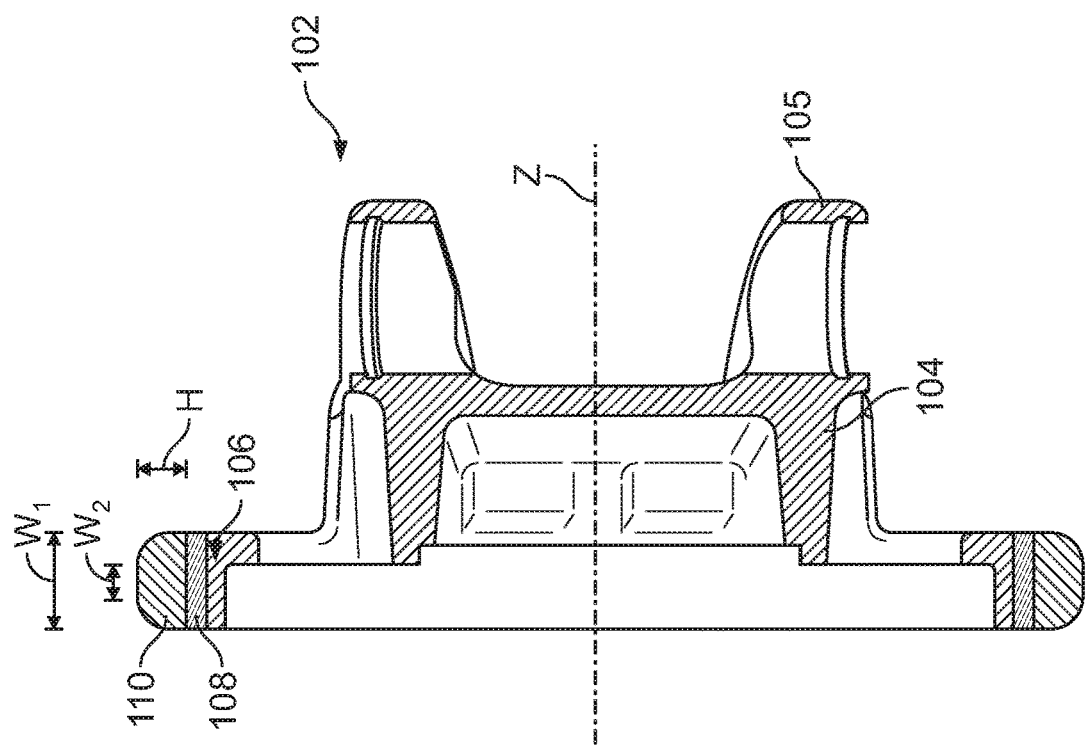
FIG. 2 is a cross-sectional diagram of a torsional damper assembly according to a first embodiment of the present disclosure.

Referring now to FIG. 2, a first embodiment of the torsional damper assembly 102 is illustrated in cross-section. The torsional damper assembly 102 is generally radially symmetric about an axis of rotation Z. In the subsequent description, "inboard" and "outboard" may be used to refer to components which are radially nearer or further from the axis of rotation Z, respectively.

The torsional damper assembly 102 includes a hub 104. The hub 104 has an inboard mating surface configured to secure to a generally tubular shaft, e.g. the drive shaft 100. In the illustrated embodiment the hub 104 is provided with mounting features 105 for coupling to a universal joint proximate the differential 88; however other embodiments may omit such features. The hub 104 is provided with an outboard peripheral flange 106. The peripheral flange 106 extends from an outboard rim of the hub 104 and defines a generally circumferential outboard surface.

A layer of elastomeric material 108 is disposed about the periphery of the peripheral flange 106 outboard of the hub 104. The elastomeric material 108 may comprise natural rubber, synthetic rubber, or any other suitably resilient material.

An annular mass 110, which may be referred to as an inertia ring, is disposed about the elastomeric material 108, e.g. via press-fitting, adhesive, or molding. The inertia ring 110 may be formed of metal or any other suitably massive material. The inertia ring 110 is secured outboard of the hub 104 with the elastomeric material 108 acting as a spring element therebetween. The elastomeric material 108 carries the inertia ring 110 in co-rotation with the hub 104 while also enabling a certain amount of relative rotation between the hub 104 and inertia ring 110, thereby absorbing vibrations from the hub 104.

The material composition of the elastomeric material 108, the material composition of the inertia ring 110, and the dimensions of the inertia ring 110 may be selected to provide a desired frequency attenuation characteristic. As will be appreciated by one of ordinary skill in the art, multiple torsion damper assemblies 102 having different frequency attenuation characteristics may be provided about a single shaft to provide damping at a plurality of frequency ranges.

The inertia ring 110 has a tapered profile, such that an inboard extremity of the inertia ring 110 has an axial width $w_1$ and an outboard extremity of the inertia ring 110 has an axial width $w_2$, where $w_1$ is greater than $w_2$. In the illustrated embodiment, this is accomplished by providing one or more arcuate regions at the outboard extremity of the inertia ring 110, e.g. with a radius of curvature approximately 50% a height h of the inertia ring 110. However, in other embodiments other tapered profiles may be provided, e.g. by providing one or more chamfered edges at the outboard extremity of the inertia ring 110.

Due to the tapered profile, a portion of any impact force applied to the inertia ring 110 is distributed radially, such that only a fraction of the impact force in the radial direction may act to displace the inertia ring 110 from the hub 104.

Advantageously, this tapered profile may be achieved while still satisfying damping requirements for the inertia ring 110.

Figure 3:
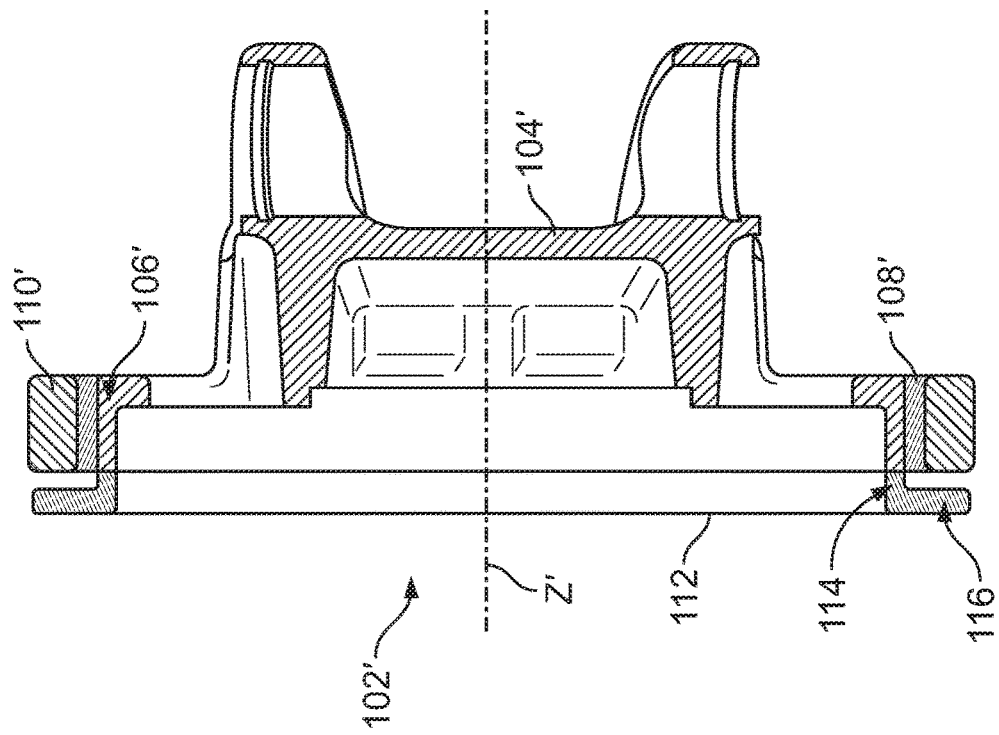
FIG. 3 is a cross-sectional diagram of a torsional damper assembly according to a second embodiment of the present disclosure.

Referring now to FIG. 3, a second embodiment of a torsional damper assembly 102' is illustrated in cross-section. The torsional damper assembly 102' is generally radially symmetric about an axis of rotation Z', having inboard and outboard directions as defined in conjunction with FIG. 2.

The torsional damper assembly 102' includes a hub 104' having an outboard peripheral flange 106' with a layer of elastomeric material 108' disposed thereabout, configured generally similarly to the hub 104 and elastomeric material 108 of the embodiment in FIG. 2.

An inertia ring 110' is disposed about the elastomeric material 108' in generally the same manner is discussed in conjunction with FIG. 2. While the inertia ring 110' is depicted as having a non-tapering profile, other embodiments may possess a tapered profile as shown in the exemplary embodiment of FIG. 2 and discussed above.

In this embodiment, the hub 104' is provided with a protective flange 112. The protective flange 112 includes an inboard portion 114 coupled to the peripheral flange 106'. The inboard portion 114 extends axially from the edge of the peripheral flange 106'. The protective flange 112 also includes a radial extension 116. The radial extension 116 extends radially outboard from the inboard portion 114. A gap is maintained between the radial extension 116 and the inertia ring 110', such that the radial extension 116 does not interfere with relative movement between the inertia ring 110' and the hub 104'.

The radial extension 116 preferably has an outer diameter which exceeds the inner diameter of the inertia ring 110'. In the illustrated embodiment the radial extension 116 has an outer diameter approximately equal to the outer diameter of the inertia ring 110; however, in other embodiments the diameters may differ according to packaging constraints or other constraints for a given implementation.

As may be seen, the protective flange 112 protects the inertia ring 110' from impact in a first direction, and additionally serves as a hard stop to prevent the inertia ring 110' from being dislodged in a second direction. Retention of the inertia ring 110' to the hub 104' is thereby improved in response to impacts from either direction.

Figure 4:
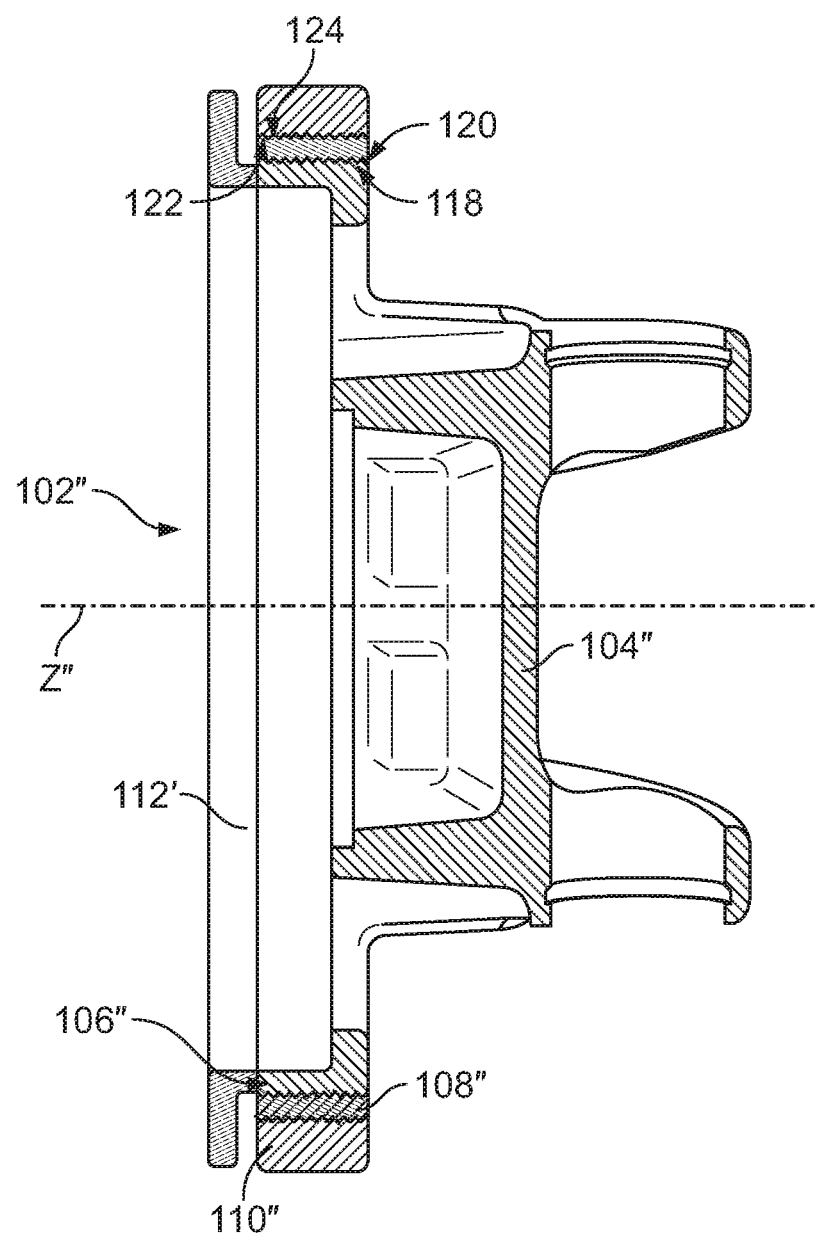
FIG. 4 is a cross-sectional diagram of a torsional damper assembly according to a third embodiment of the present disclosure.

Referring now to FIG. 4, a third embodiment of a torsional damper assembly 102" is illustrated in cross-section. The torsional damper assembly 102" is generally radially symmetric about an axis of rotation Z", having inboard and outboard directions as defined in conjunction with FIG. 2.

The torsional damper assembly 102" includes a hub 104" having an outboard peripheral flange 106" with a layer of elastomeric material 108" disposed thereabout, configured generally similarly to the hub 104 and elastomeric material 108 of the embodiment in FIG. 2.

An inertia ring 110" is disposed about the elastomeric material 108" in generally the same manner is discussed in conjunction with FIG. 2. While the inertia ring 110" is depicted as having a non-tapering profile, other embodiments may possess a tapered profile as shown in the exemplary embodiment of FIG. 2 and discussed above.

In this embodiment a protective flange 112' is provided, configured in a generally similar fashion as the protective flange 112 illustrated in FIG. 3. However, other embodiments may omit the protective flange 112'.

The outboard surface of the peripheral flange 106" is provided with a first set of one or more surface features 118, and the inboard surface of the elastomeric material 108" is provided with a second set of one or more surface features 120 As used herein, surface features refer to grooves, ridges, protrusions, protuberances, threads, or any other physical feature by which engagement between the outboard surface of the peripheral flange 106" and the inboard surface of the elastomeric material 108" may be increased. In the illustrated embodiment, the first set of surface features 118 comprises a first set of alternating circumferential grooves and circumferential ridges extending about the outboard surface of the peripheral flange 106", and the second set of surface features 118 comprises a second, complementary set of alternating circumferential grooves and circumferential ridges extending about the inboard surface of the elastomeric material 108". Advantageously, in such a configuration axial engagement between the components is increased without impairing relative rotation therebetween. However, in other embodiments other feature combinations may be used, including providing surface features on only one of the peripheral flange 106" and the elastomeric material 108".

The outboard surface of the elastomeric material 108" is provided with a third set of one or more surface features 122, and the inboard surface of the inertia ring 110" is provided with a fourth set of one or more surface features 124. In the illustrated embodiment, the third set of surface features 122 comprises a third set of alternating circumferential grooves and circumferential ridges extending about the outboard surface of the elastomeric material 108", and the fourth set of surface features 124 comprises a fourth, complementary set of alternating circumferential grooves and circumferential ridges extending about the inboard surface of the inertia ring 110". Advantageously, in such a configuration axial engagement between the components is increased without impairing relative rotation therebetween. However, in other embodiments other feature combinations may be used, including providing surface features on only one of the elastomeric material 108" and the inertia ring 110".

In the illustrated embodiment and other embodiments where the surface features 118, 120, 122, and 124 comprise respective sets of circumferential grooves and ridges, the grooves and ridges may optionally have axially asymmetric profiles such that relative motion in an installation axial direction is facilitated while relative motion in a removal axial direction is impeded.

As may be seen, the present disclosure provides various features to increase retention of an inertia ring in a desired location of a vibration absorber assembly. These features may be implemented singly or in any suitable combination with one another to provide increased robustness without compromising performance of the vibration absorber.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A torsional damper assembly comprising:
   a hub having an outer periphery;
   an annular elastomeric element disposed about the outer periphery;
   an annular inertia ring disposed about the elastomeric element, the inertia ring having an inner periphery adjacent the elastomeric element, wherein the inertia ring has a first axial width at an inboard periphery and a second axial width at an outboard periphery, the first axial width being greater than the second axial width; and
   a protective flange having an inboard portion coupled to the outer periphery of the hub and a radial extension portion extending outboard of the inboard portion, wherein the radial extension portion is axially spaced from the inertia ring.

2. The torsional damper assembly of claim 1, wherein an outer diameter of the protective flange is greater than an inner diameter of the inertia ring.

3. The torsional damper assembly of claim 1, wherein the inertia ring has a profile comprising at least one arcuate section between the inboard periphery and the outboard periphery.

4. The torsional damper assembly of claim 1, wherein the hub is disposed about a drive shaft of an automotive vehicle.

* * * * *